United States Patent Office 3,314,853
Patented Apr. 18, 1967

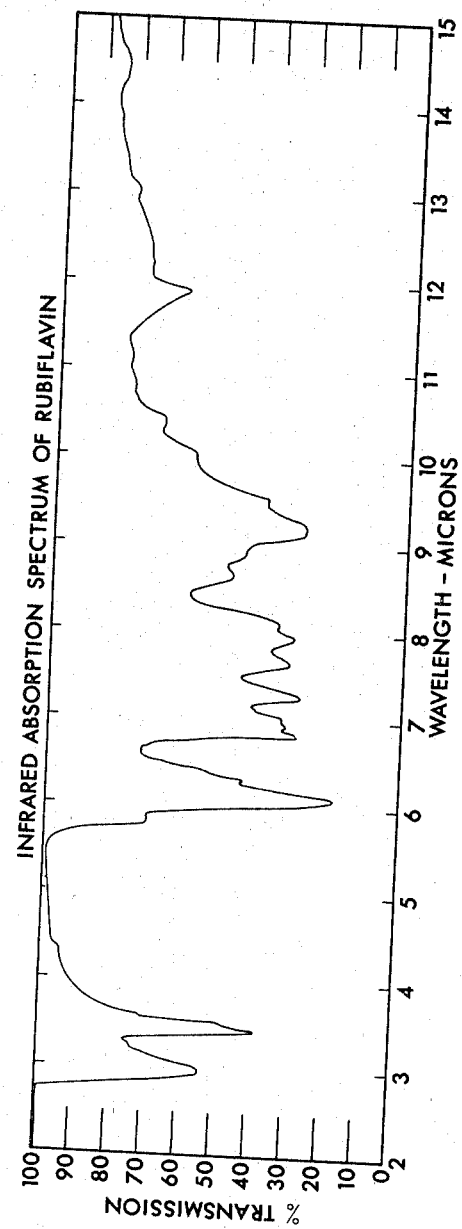

3,314,853
RUBIFLAVIN AND A PROCESS FOR MAKING SAME USING STREPTOMYCES GRISEUS
Felix Edward Pansy, Jamesburg, Adorjan Aszalos, Kendall Park, and Robert S. Robison, North Brunswick, N.J., assignors, by mesne assignments, to E. R. Squibb & Sons, Inc., New York, N.Y., a corporation of Delaware
Filed Aug. 25, 1964, Ser. No. 391,911
2 Claims. (Cl. 167—65)

This invention relates to a new antibiotic named rubiflavin and to a method for its production. The new antibiotic is produced by a strain of *Streptomyces griseus* (ATCC 15569) isolated from a soil sample from Espiritu Santo State, Brazil.

*Streptomyces griseus* (ATCC 15569) produces the antibacterial antibiotic rubiflavin by culturing at a temperature in the range of about 23° to 30° C., preferably about 25° C., under submerged aerobic conditions in an aqueous nutrient medium containing an assimilable, fermentable carbohydrate source and an assimilable nitrogen source. Suitable carbohydrate sources include starch, dextrin, sugars, such as maltose, lactose and glucose, etc. Suitable nitrogen sources include asparagine, casein hydrolysate, soybean meal, cornsteep liquor, beef extract, yeast extract, etc. Fermentation is carried out for about one to seven days, preferably 4 to 5 days. At the end of this period of time, a substantial amount of rubiflavin has been formed.

Rubiflavin may be obtained by first filtering the crude fermentation broth without adjusting the pH, which is about 7.6, then extracting both the filtrate and filter cake with a water immiscible solvent such as chloroform, ethylacetate, benzene or the like, preferably the first. The solvent extracts are combined, dried and the solvent is evaporated. The oily residue is suspended in 15 to 20 volumes of ether or cyclohexene. The precipitate which forms is separated and discarded.

Dry hydrogen chloride is introduced into the ether supernatant and the hydrochloride salt which forms is separated by centrifuging or the like. After washing with ether and drying, the hydrochloride is converted into rubiflavin free base with dilute aqueous sodium carbonate solution and then treated with a water immiscible solvent such as those mentioned above. The rubiflavin is recovered from the organic phase as a red powder and may be further purified, e.g., by countercurrent extraction. A solvent system using ethyl acetate and a 0.1 M phosphate buffer system at about pH 7.5 and a temperature below about room temperature, e.g., about 3° to 10° C. but preferably about 5° C. in a Craig apparatus is preferably used.

For final purification, the steps described before may be repeated. The extracts are extracted with chloroform or other water immiscible solvent described previously, dried and the solvent evaporated. The residual brick red powder is dissolved in ether, HCl gas is added and the hydrochloride salt is centrifuged. This is then reconverted to the free base with dilute aqueous sodium carbonate solution. The free rubiflavin is extracted again with water immiscible solvent, dried and the solvent evaporated to leave the pure product.

Rubiflavin is soluble in acidic water, methanol, ethanol, acetone, dimethylsulfoxide, ethyl acetate, chloroform, benzene and ether. It is slightly soluble in distilled water and in hexane. The product cannot be crystallized from solvent systems such as hexane, ether, hexane-ether, chloroform, chloroform-hexane, methanol, methanol-hexane, acetonitrile, methylethyl ketone, methylethyl ketone-hexane, ethanol, ethyl acetate, cyclohexane or butanol, either as the free base or in the form of the sulfate, hydrochloride, phosphate, oxalate, maleate, picrate, p-nitrobenzenesulfonate, naphthylsulfonate or reineckate.

The following example is illustrative of the invention.

EXAMPLE

The microorganism *Streptomyces griseus* (ATCC 15569) is isolated from a soil sample by conventional streaking methods. The aerial mycelium on soybean meal agar and yeast beef extract agar is cream colored. On soybean meal agar a brown soluble pigment is produced. It is maintained on an agar slant made from 20 g. of oatmeal, 20 g. of tomato paste and 500 ml. of boiling water which are cooked to a thin gruel, filtered, then added to 15 g. of agar in 500 ml. of water and sterilzed at 121° C. and 15 pounds steam pressure for 20 minutes.

A well sporulated slant is used to inoculate 50 ml. of sterilized broth in a 250 ml. flask. The broth has the following composition (on a weight basis):

| | |
|---|---|
| Soybean meal, percent | 1.5 |
| Dehydrated mashed potato, percent | 1.5 |
| Glucose, percent | 5.0 |
| $CoCl_2 \cdot 2H_2O$, percent | 0.0005 |
| $CaCO_3$, percent | 1.0 |
| Distilled water, ml. | to 1000 |

Autoclave at 121° C. and 15 pounds steam pressure for 30 minutes.

After 48 hours incubation at 25° C. on a rotary shaker, the contents of the flask are transformed to 1000 ml. of the above sterile medium in a 4000 ml. flask. After 48 hour incubation on a rotary shaker at 25° C., the entire contents of the flask are used to inoculate a 100 gallon germinator tank containing 60 gallons of a sterile nutrient medium having the following composition (by weight)

| | Percent |
|---|---|
| Soybean meal | 3.0 |
| Glucose | 5.0 |
| $CaCO_3$ | 0.7 |
| Corn steep liquor | 0.25 |
| Defoamer (prime burning oil) | 0.05 |

Growth is continued for an additional 48 hours at 25° C., with an air rate of 1.0 ft./min. superficial air velocity and agitation equivalent to 0.2 H.P./100 gal. At this time approximately 40 gallons of the germinator inoculum is used to inoculate 800 gallons of the following medium contained in a 1300 gallon fermentor:

| | Percent |
|---|---|
| Soybean meal | 3.0 |
| Glucose | 5.0 |
| $CaCO_3$ | 0.7 |
| Corn steep liquor | 0.25 |
| Defoamer (prime burning oil) | 0.05 |

The fermentation is continued for 120 hours at 25° C. The air rate is 15 ft./min. superficial air velocity and agitation equivalent to 0.2 H.P./100 gal. is used.

Upon completion of the fermentation period, the 800 gallon fermentation broth is filtered. The filtration broth and the filter cake are extracted separately with chloroform. Chloroform in the amount of ⅓ of the volume of the filtered broth is used for extracting the filtrate and this chloroform solution is then used to extract the filter cake. Extraction is carried out at harvest pH (approximately 7.6) and at room temperature.

The chloroform extract is dried with sodium sulfate overnight, then the sodium sulfate is filtered off and the chloroform is evaporated. The oily residue is suspended in 15 to 20 volumes of dry ether. The precipitate which forms is centrifuged off and discarded. Dry HCl gas is introduced into the ether supernatant and the solid hydrochloride salt of rubiflavin which forms is centrifuged, washed with dry ether and dried in vacuo. A 4% aqueous sodium carbonate solution and chloroform are quickly shaken with the salt (the amount of each solvent added is 50 times the weight of the hydrochloride).

After separation, the water phase is adjusted to pH 10 and extracted once more with chloroform. All chloroform extracts are combined, dried with sodium sulfate, fiiltered and evaporated. The dry, red powder obtained by evaporation yields about 150 grams of product.

Two grams of the crude product thus obtained are dissolved in 20/20 ml. of the following system: 0.1 M aqueous phosphate buffer, pH 7.5, and ethyl acetate equilibrated at 5° C. Ten ml. of each of the upper and lower phases are put into the first two tubes of a Craig extraction instrument and 39 transfers are made at 5° C. Both upper and lower phases from tubes Nos. 9 to 19 are collected. The combined upper organic phases are collected and the lower aqueous phases are shaken twice with chloroform. The upper phases and chloroform extracts are are combined and dried with sodium sulfate. The solvent is evaporated and the residual brick red powder is collected.

The red product is further purified by dissolving in about 500 ml. of dry ether. Dry HCl gas is introduced and the precipitated hydrochloride salt is collected by centrifuging. Then it is washed with ether and dried. This salt is added to 500 ml. of 4% sodium carbonate solution and 500 ml. of chloroform, quickly shaken and reextracted with an equal volume of chloroform. The chloroform phases are dried and the solvent evaporated to obtain the pure product rubiflavin.

Rubiflavin has the following average elemental analysis: C, 68.50; H, 7.50; N, 3.45%; O (by difference), 20.55. No halogen or sulfur is present. The molecular formula is $C_{23}H_{29}NO_5$ and an equivalent weight of 400 has been assigned. Analysis by ultracentrifugation and from the sedimentation and diffusion constants, a molecular weight of 412 is calculated which confirms the above. It is an amorphous red powder which has no well defined melting point but melts in the range of 149 to 157° C.

Rubuflavin has absorption bands (min.) in the infrared spectrum at 2.97, 3.45, 6.06, 6.31, 6.83, 6.95, 7.02, 7.27, 7.95, 8.12, 9.12–9.25 microns (KBr pellets) as shown in the accompanying figure. It absorbs in the ultraviolet and visible range as follows: maximum at 244 m$\mu$ and 428 m$\mu$, with shoulders at 265 m$\mu$, 395 m$\mu$ and 446 m$\mu$ (absolute ethanol).

The antibiotic is soluble in acidic water, methanol, ethanol, butanol, acetone, dimethylsulfoxide, ethyl acetate, chloroform, benzene and ether. It is very slightly soluble in distilled water and slightly soluble in hexane. It is unstable in water and alcohols but is stable in ethyl acetate, chloroform, benzene and ether. It turns yellow in acidic water and violet in alkaline water; the color change is reversible. Rubiflavin gives a positive permanganate test, reacting very rapidly, and a negative reaction with ferric chloride, 2,4-dinitrophenylhydrazine, Tollers reagent and ninhydrin. The Hinsburg Method for distinguishing amines shows the compound to have a secondary amine. The compound has one N-methyl group per 400 equivalent weight. It cannot be reduced at atmospheric pressure with platinum or palladium catalyst in ethyl acetate.

Rubiflavin is acetylated by adding 1 ml. of acetic anhydride to a solution of 30 mg. of the compound in 1 ml. of pyridine and heating at 50° C. for 24 hours. All volatiles are evaporated and the yellow solid residue is dried in vacuo at 25° C. The acetyl number is 16%. The acetylated compound has absorption bands (min.) in the infrared region at 3.42, 5.64, 5.74, 5.95, 6.04, 6.27, 6.38, 6.82, 6.95, 7.30, 7.54, 7.65, 8.10, 8.43, 9.22 and 9.55 microns (KBr pellets).

Rubiflavin forms acid salts with inorganic and organic acids, e.g., hydrohalides such as hydrochloride, hydrobromide, etc., sulfate, phosphate, oxalate, malonate, etc.

Rubiflavin shows the following in vitro spectrum against gram negative and gram positive organisms:

Table I.—In vitro spectrum

| Organism: | Minimum inhibitory conc. (mcg./ml.) |
|---|---|
| Staphylococcus aureus 209 P | 1.4 |
| Staphylococcus aureus Cahill | 3.9 |
| Bacillus subtilis | -- |
| Bacillus cereus | 1.8 |
| Streptococcus agalactiae | 0.9 |
| Proteus vulgaris | 37.5 |
| Pseudomonas aeruginosa | 4.7 |
| Salmonella schottmuelleri | 4.7 |
| Salmonella typhimurium | 9.4 |
| Candida albicans | 9.4 |
| Trichophyton mentagrophytes | 15.6 |
| Fusarium bulbigenum | 25.0 |

Rubiflavin is distinguishable from other antibiotics. It can be distinguished from pluramycin by Craig analysis. After 50 transfers in an ethyl acetate-pH 6.55 phosphate buffer system, pluramycin can be recovered from tubes 30 to 49, while rubiflavin remains at the origin. Pluramycin, after 30 transfers in an ethyl acetate-pH 5.3 phosphate buffer Craig system, has an activity peak at tube 4; rubiflavin does not move at all. No absorption of pluramycin is reported in the visible range but absorbs at 219 m$\mu$ while rubiflavin has no absorption at that point.

Rubiflavin may be distingiushed from streptovaricin by paper chromatography. In the system methanol-benzene-water (1:1:2) and using Schleicher Schule No. 589 paper, rubiflavin does not move while all types of streptovaricin do move. Moreover, streptovaricin is nearly insoluble in ether and hexane while rubiflavin is soluble in both solvents.

Anthracidin A and B are distinguishable in that they are stable at pH 5 through 9 while rubiflavin is not. The infrared and ultraviolet spectra of the anthracidins and rubiflavin differ from each other.

Rubiflavin has antibacterial activity, e.g., against both gram positive and gram negative organisms such as *Staphylococcus aureus, Proteus vulgaris, Pseudomonas aeruginosa, Salmonella schottmuelleri* and *Trichophyton mentagrophytes* being useful primarily as the antibacterial agent in disinfectants or sterilizing solutions or as a preservative in plastics, paints or fabrics. It also shows cytotoxic activity by suppressing the growth of Carcinoma CA–755 in mice and extending the life of mice affected with Leukemia L–1210 as well as suppressing the growth of KB kidney cells in tissue culture at dilutions ranging from 1:170,000 to 1:220,000.

What is claimed is:
1. An antibiotic selected from the group consisting of rubiflavin and salts thereof, said rubiflavin being a red amorphous material having the following average elemental analysis: C, 68.5; H, 7.5; N, 3.45; O, 20.55; a molecular formula of $C_{23}H_{29}NO_5$; a molecular weight about 400; melting in the range of about 149° to 157°

C.; soluble in methanol, ethanol, butanol, acetone, dimethylsulfoxide, ethyl acetate, chloroform, benzene and ether; absorption bands in the ultraviolet and visible spectra as follows: maxima at 244 and 428 m$\mu$ and shoulders at 265, 395 and 446 m$\mu$ (in ethanol); and an infrared absorption spectrum as shown in the drawing.

2. A process for producing the antibiotic of claim 1 which comprises culturing *Streptomyces griseus* ATCC 15569 under aerobic conditions in an aqueous nutrient medium comprising an assimilable, fermentable carbohydrate and assimilable organic nitrogen source for about three to seven days and recovering rubiflavin from the medium.

References Cited by the Examiner
UNITED STATES PATENTS

| | | | |
|---|---|---|---|
| 2,798,834 | 7/1957 | Hobson | 167—65 |
| 2,885,326 | 5/1959 | Churchill | 195—80 |
| 3,092,550 | 6/1963 | Gaeumann et al. | 167—65 |

ALBERT T. MEYERS, *Primary Examiner.*

DAREN M. STEPHENS, *Assistant Examiner.*